(No Model.) 7 Sheets—Sheet 2.
A. S. LYON.
APPARATUS FOR SKEIN DYEING.

No. 476,286. Patented June 7, 1892.

WITNESSES.
S. G. Stephens.
Myrtie C. Beals.

INVENTOR.
Alvin S. Lyon,
By Albert M. Moore,
His Attorney.

(No Model.) 7 Sheets—Sheet 3.
A. S. LYON.
APPARATUS FOR SKEIN DYEING.
No. 476,286. Patented June 7, 1892.
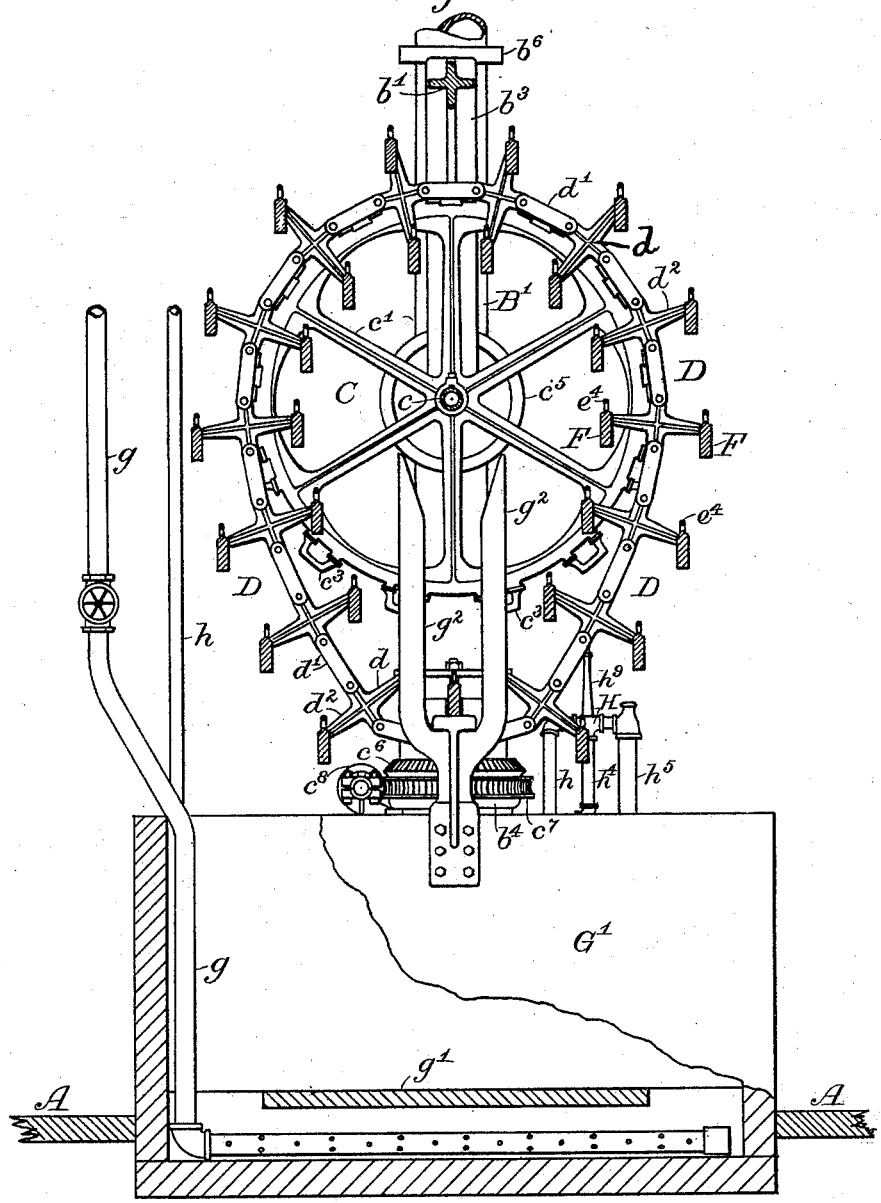
WITNESSES.
S. G. Stephens.
Myrtie C. Beals.
INVENTOR.
Alvin S. Lyon,
By Albert W. Moore,
His Attorney.

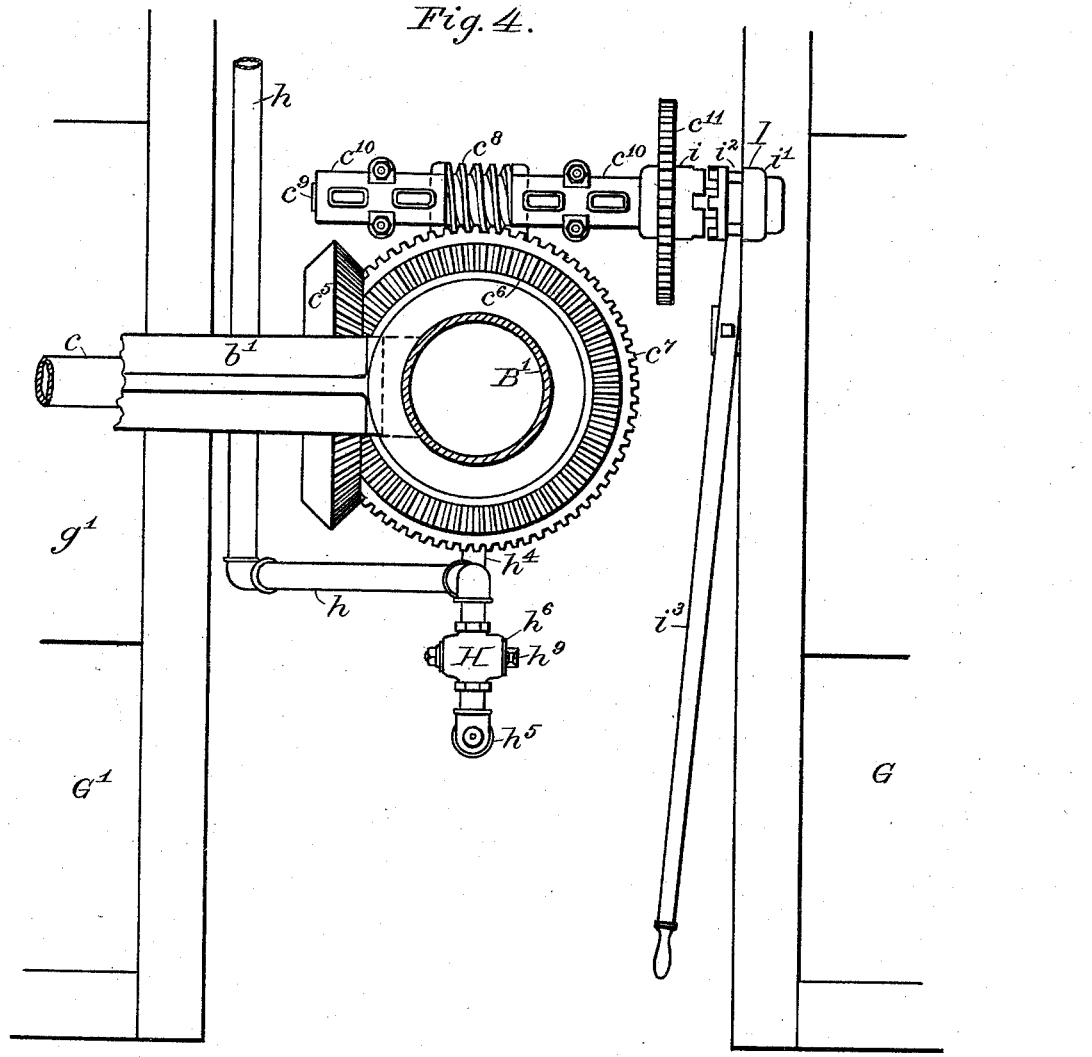

(No Model.) 7 Sheets—Sheet 5.
A. S. LYON.
APPARATUS FOR SKEIN DYEING.
No. 476,286. Patented June 7, 1892.
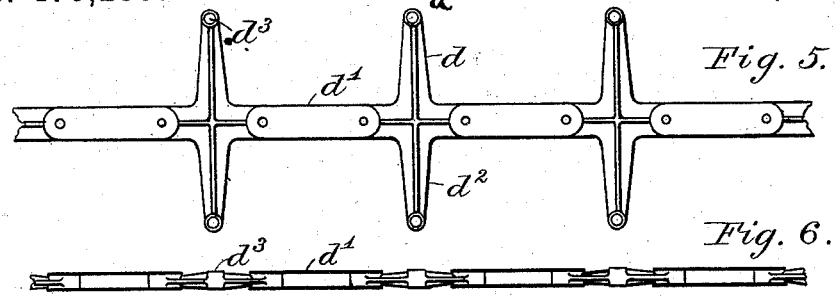
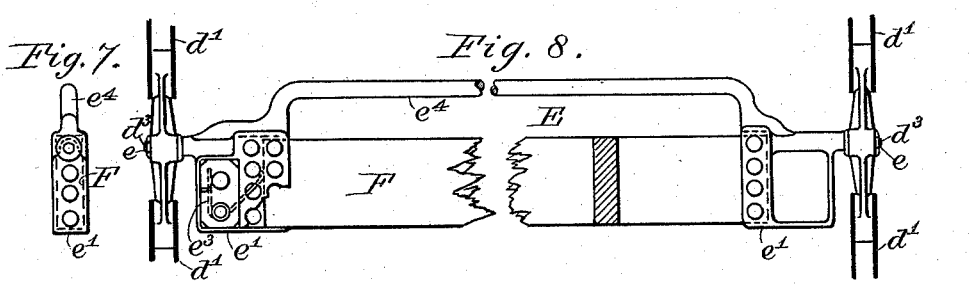
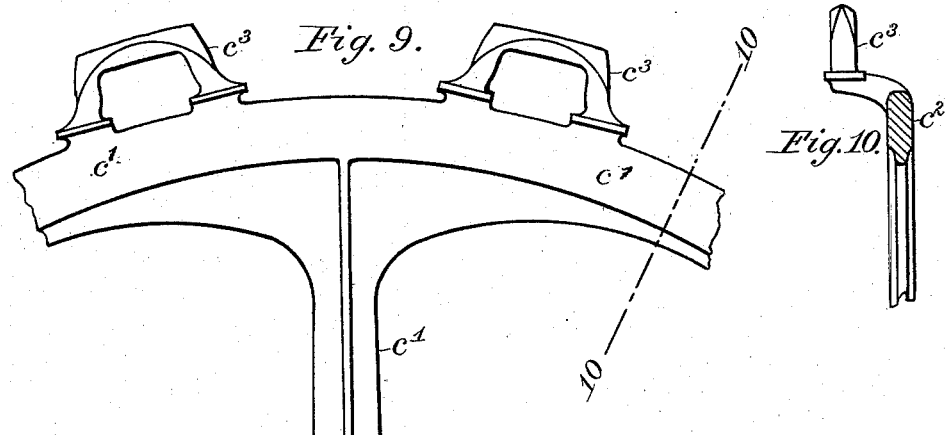
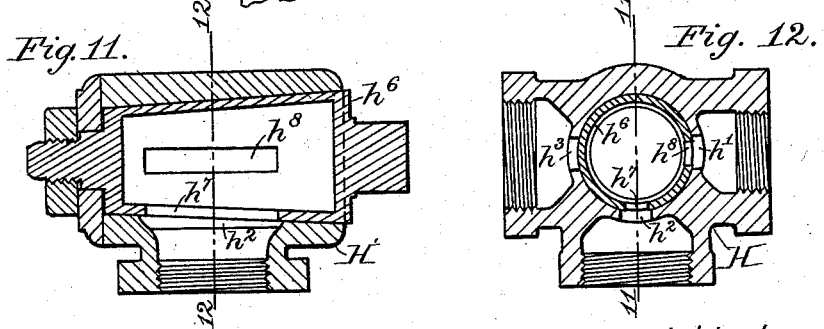
WITNESSES.
S. G. Stephens.
Myrtie C. Beals.
INVENTOR.
Alvin S. Lyon,
By Albert M. Moore,
His Attorney.

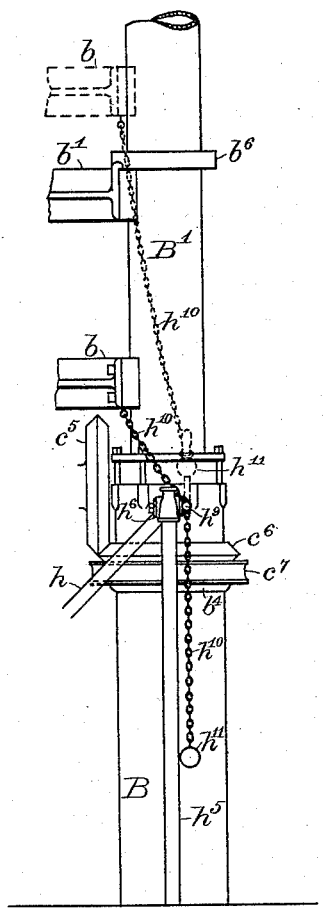
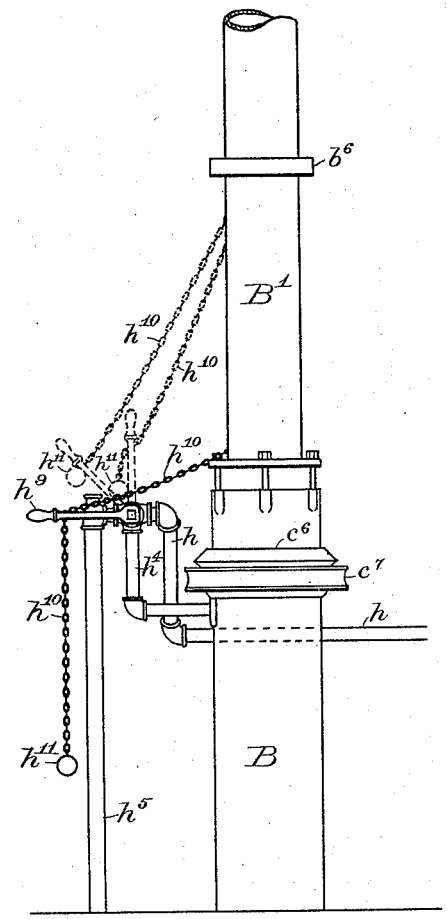

(No Model.) 7 Sheets—Sheet 7.

A. S. LYON.
APPARATUS FOR SKEIN DYEING.

No. 476,286. Patented June 7, 1892.

WITNESSES.
Saml. G. Stephens.
Myrtie C. Beale.

INVENTOR.
Alvin S. Lyon,
By Albert M. Moore,
His Attorney.

UNITED STATES PATENT OFFICE.

ALVIN S. LYON, OF LOWELL, MASSACHUSETTS.

APPARATUS FOR SKEIN-DYEING.

SPECIFICATION forming part of Letters Patent No. 476,286, dated June 7, 1892.

Application filed January 2, 1891. Serial No. 376,511. (No model.)

*To all whom it may concern:*

Be it known that I, ALVIN S. LYON, a citizen of the United States, residing at Lowell, in the county of Middlesex and Commonwealth of Massachusetts, have invented a certain new and useful Improvement in Skein Dyeing and Washing Machines, of which the following is a specification.

My invention relates to skein dyeing and washing machines; and it consists in the devices and combinations hereinafter described and claimed, the general object of which is to dye with uniformity and rapidity in the skein such yarns as require to be treated with boiling dyes without tangling the yarns and thereafter to wash the yarns and to perform the entire operation by machinery requiring less floor-space than has heretofore been devoted to such purposes and the labor of fewer persons than heretofore employed.

Figure 1:
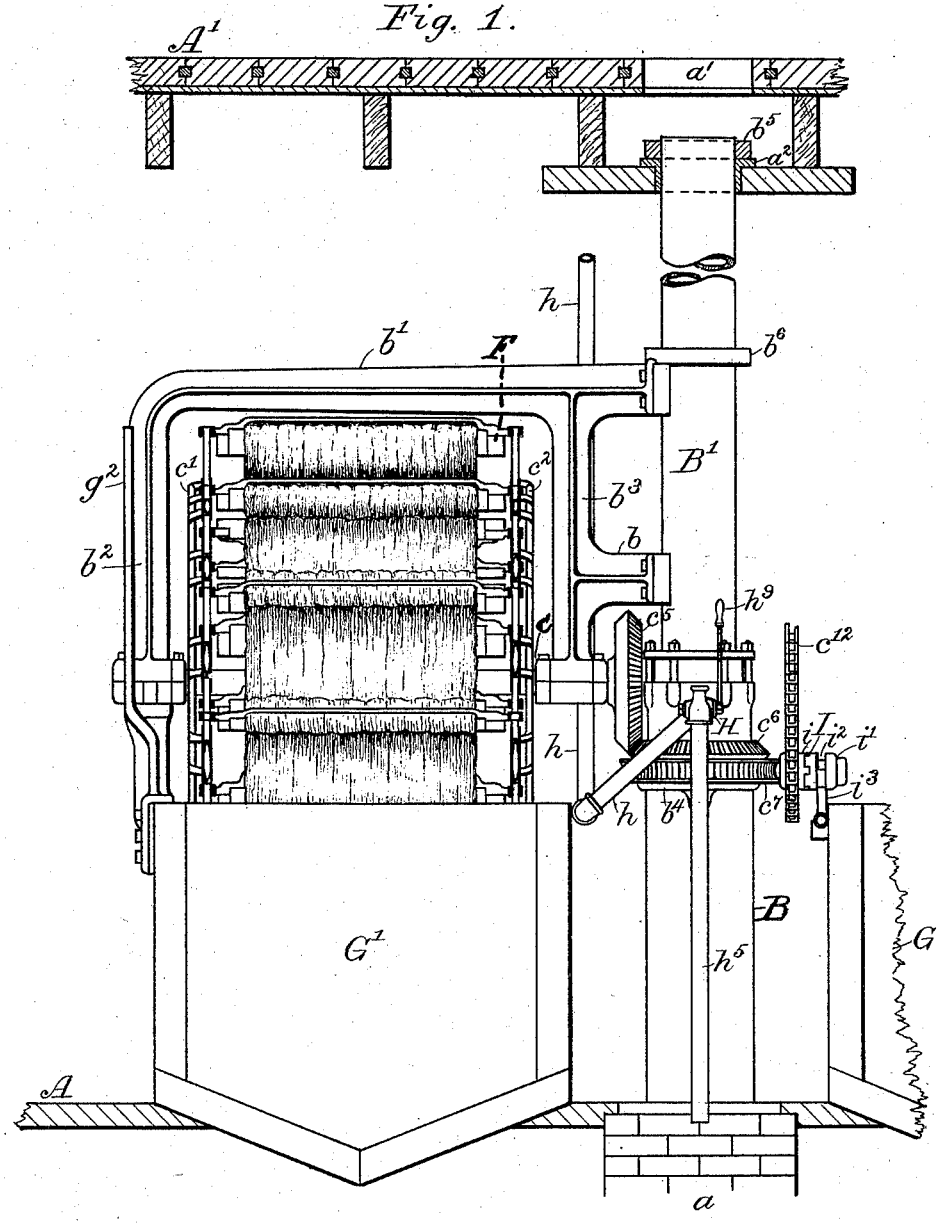
Figure 2:
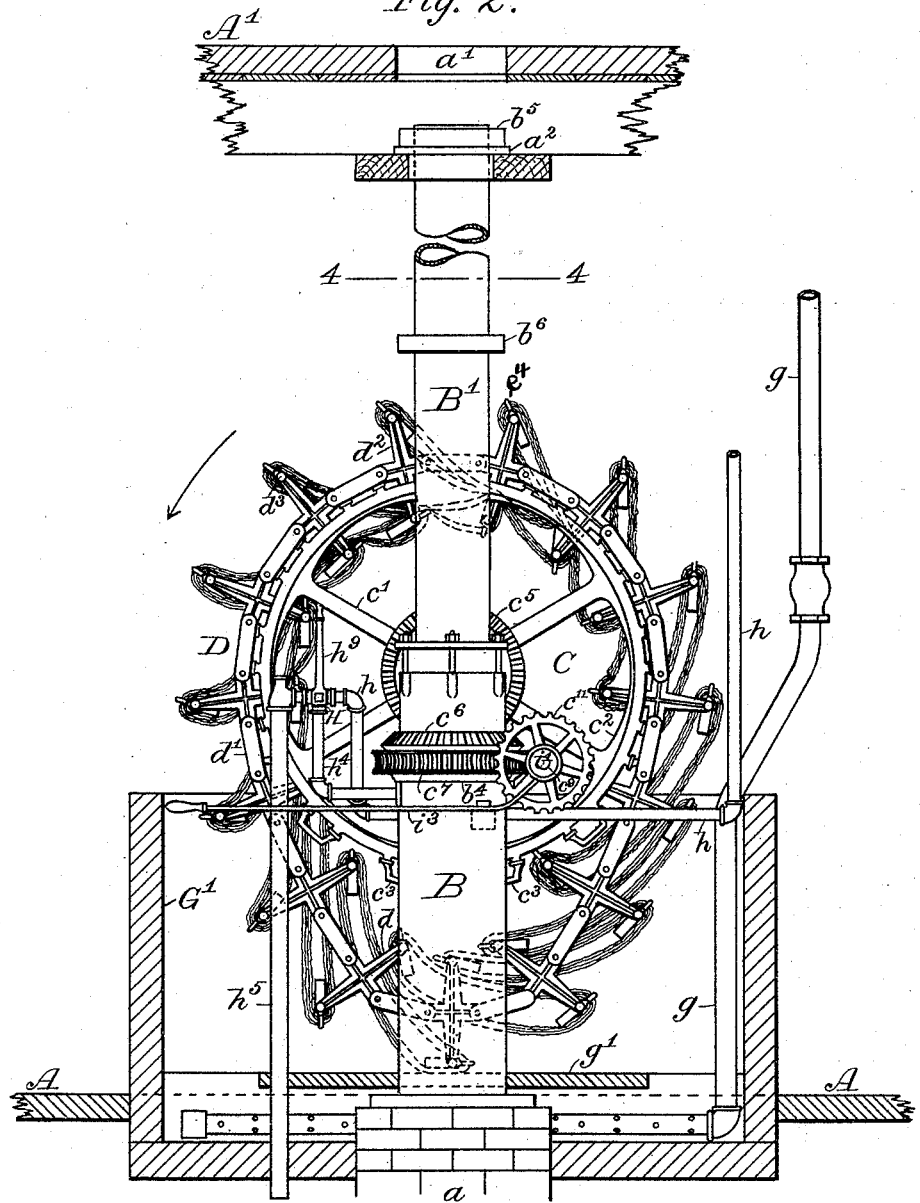
Figure 15:
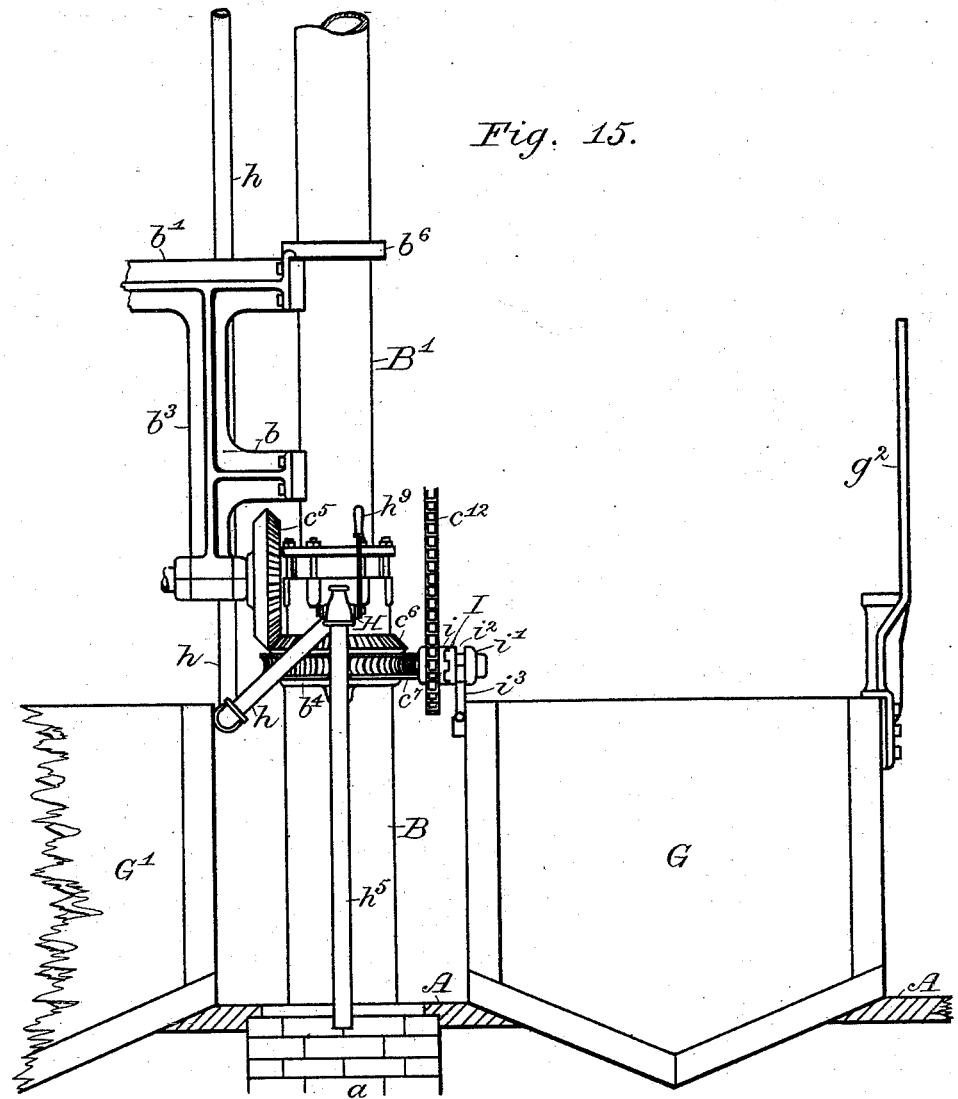

In the accompanying drawings, on seven sheets, Figure 1 is a front elevation of my improved machine, showing the floor on which it stands and the ceiling or floor above in vertical section, a part of the water-tank and the ram of the hydraulic hoist being broken away; Fig. 2, a side elevation of the hoist, reel, chains, carrying-poles having skeins of yarn thereon, and a section of the dye-vat, showing the steam-pipe, the shield, and the positions of the skeins in said dye-vat; Fig. 3, a side elevation of a part of the dye-vat, the remainder thereof being in section, and a vertical section of the reel and poles which receive the skeins of yarn, the chain being lifted out of said vat; Fig. 4, a horizontal section on the line 4 4 in Fig. 2 of the ram, showing in plan the clutch, worm, and miter gears, showing a part of the arm of the hydraulic hoist, a part of the supply-pipe of said hoist, a part of the dye-vat, and a part of the water-tank; Fig. 5, a side elevation of a part of one of the pole-supporting chains; Fig. 6, a plan of the same; Fig. 7, an end elevation of one of the skein-carrying poles and the pole-receiver; Fig. 8, a front elevation of a pole-receiver and pole and adjacent parts of the pole-carrying chain; Fig. 9, a side elevation of a part of the reel or wheel which carries the chain; Fig. 10, a section on the line 10 10 in Fig. 9; Fig. 11, a central section on the line 11 11 in Fig. 12 of the three-way cock and two-way plug; Fig. 12, a section on the line 12 12 in Fig. 11; Figs. 13 and 14, respectively, front and side elevations of the principal parts of the hydraulic hoist, showing the lever and chains, which control the admission of water to said hoist and the discharge of the same therefrom, said lever being shown in full lines in Fig. 14 in the position it occupies when the three-way cock is open to raise the ram of the hoist, the inclined dotted lines showing the same in the position it occupies when said cock is shut and the vertical dotted lines showing the position said lever occupies when said cock is open to discharge the water from the cylinder in said hoist to lower said ram; Fig. 15, a front elevation of part of the hoist, a part of the dye-vat, the pier on which the hoist is supported, the water-tank provided with a guide-fork, and a vertical section of the floor on which said vat and tank are supported.

It has heretofore been very difficult to dye yarns in the skein, as woolen yarns, in boiling dyes, the violent movement of the dyeing-liquor snarling the yarns and tangling them with each other, it being almost impossible to keep them in proper places on the reels heretofore used. It has also been difficult with such reels to subject all parts of the skein and yarn equally to the action of the dye-liquor, which does not so readily enter the yarn in those parts of the skein which come in contact with the reel or the poles carried by the reel, it being necessary with the appliances heretofore used to hold the skeins with a certain amount of tension to lessen the liability of their becoming tangled with each other. With such appliances heretofore used also it has been difficult to submerge equally all parts of the skein. For these reasons much of the skein-dyeing has heretofore been done by hand, the skeins being placed on long poles and allowed to hang down in the hot dye, the poles resting upon the top of the sides of the dye-vat, and the poles, with the skeins, being moved from end to end of the vat and from place to place therein and the skeins being drawn over the poles by hand to bring all parts of the skeins in the dye-liquor. A better result is accomplished with greater ease, more expeditiously, and with much less expense by the means hereinafter described.

A is the floor on which the operator stands; A', the floor above; $a^2$, a guide-ring arranged in a hole $a'$ in said upper floor and surrounding the ram B' of a hydraulic hoist; $b^5$ $b^6$, stop-collars on said ram above and below said guide-ring, and B the cylinder of said hoist, resting upon a pier $a$ of masonry in the usual manner, said hoist being, except as hereinafter stated, of the usual construction and operation.

To the ram B' is secured a bracket having horizontal arms $b$ $b'$ and downward extensions $b^2$ $b^3$, in which is journaled the shaft $c$ of the reel C, the same being composed of two wheels $c'$ $c^2$, fast on said shaft $c$ and having sprockets $c^3$ (see Fig. 9) to engage the links of the sprocket-chain D. Each chain consists of a series of jointed links, single links $d$ alternating with double links $d'$ in a usual manner, the sprockets or projections $c^3$ entering between the double links $d'$. The single links $d$ of each sprocket-chain are provided with arms $d^2$, which extend from said links $d$ at right angles therewith in opposite directions and in the plane in which such chain travels. At the free or outer end of each arm $d^2$ is a hole $d^3$, formed horizontally in said arms at right angles to the plane in which said arms lie, to receive one of the trunnions $e$ of the pole-receiver E. The pole-receiver E is metallic, preferably copper, and of the form shown in Figs. 7 and 8, having, as above intimated, two trunnions $e$, on which said pole-receiver swings in the chains, the axis of said trunnions being parallel with the shaft $c$. Each pole-receiver E is provided near each trunnion with a pole-receiving socket $e'$, each socket being of a suitable shape to receive an end of the pole F. The "pole" F is so-called not from its shape, but because its use is analogous to that of the poles commonly used in skein-dyeing by hand and is a rectangular board shorter than the distance between the outer closed ends of the pole-receiving sockets of the pole, but longer than the distance between the ends of said sockets nearest to each other. One of the sockets of each pole-receiver E contains a spring $e^3$, (see Fig. 8,) and into this socket the pole F is first placed and forced against the pressure of the spring $e^3$, until the other end of said pole can be raised up into the inner open end of the other pole-receiving socket into which last-named socket it is forced and in which it is retained by the pressure of said spring. The sockets of the pole-receiver are connected by a metallic rod or yarn-guard $e^4$, secured to or cast in one piece with said sockets and supported out of contact with a pole F. Each pole F and yarn-guard $e^4$ are parallel with the shaft $c$ on which the reel C is fast.

The reel C is rotated by the following means: The shaft $c$ of said reel is provided with a miter-gear $c^5$, which engages another miter-gear $c^6$, formed in one piece with or otherwise secured to a worm-gear $c^7$, which turns loosely on the cylinder B of the hydraulic hoist, being supported thereon by an annular ledge or shelf $b^4$. The worm-gear $c^7$ is engaged by a worm $c^8$, secured on a horizontal shaft $c^9$, supported in suitable bearings $c^{10}$, and carrying a sprocket-wheel $c^{11}$ loose on said shaft $c^9$, and rotated by a sprocket-chain $c^{12}$, connected with any suitable motor. One part $i$ of the clutch I is fast on the hub of said sprocket-wheel $c^{11}$, its counterpart $i'$ sliding on the worm-shaft, but prevented from turning thereon, and having an annular groove $i^2$, which receives a fork of a shipping-lever $i^3$, by means of which lever the clutch I may be closed to rotate the worm $c^8$ or opened to stop the rotation of said worm in the usual manner. Obviously, the worm-shaft might be rotated by any usual means; but a sprocket-chain is preferable to a belt, because of the extreme dampness of the atmosphere in which dyeing-machines are used.

At equal distances from the center of the cylinder B, on opposite sides of the same, are arranged a suitable water-tank G, of ordinary construction, and a dye-vat G', each having a sufficient inside width to admit the reel and chains. The dye-vat G' is heated in the usual manner by perforated steam-pipes $g$, which lie along the bottom of the same and keep the liquid dye contained therein boiling briskly. The bottom of the dye-vat is inclined upward in opposite directions from the center thereof, and a shield $g'$ reaches from side to side of said vat above said pipes, the object of said shield being to prevent the yarns and skeins from being tangled with each other by the violent ebullition of the dye-liquor, said shield being considerably wider than the distance between two sockets $e'$ of the same pole-receiver, so that there is a comparatively still place in the dye-liquor immediately above said shield $g'$, while the liquor at each side of the shield is violently agitated.

Externally the dye-vat and water-tank are of the usual shape and each is provided with a guide-fork $g^2$, Fig. 1, on the side farthest from the hoist to receive the outer journal-box of the reel C when said reel is lowered into said vat or tank.

The skeins of yarn are arranged upon the poles F between the wooden part of the pole and its yarn-guard $e^4$, and are then carried downward between the two poles next below and around the outer pole of the second pair below, as best shown in Fig. 1. The reel is then lowered until the miter-gear $c^5$ engages with the miter-gear $c^6$, and is rotated as above described. It will be seen that the skeins of yarn are successively carried down into the dye-vat nearly into contact with the shield or board $g'$, thereby agitating the dye-liquor and keeping the same constantly mixed, and that the wooden poles on coming in contact with the dye-liquor float therein and constantly assume new positions, owing to their being eccentrically journaled and to their buoyancy when in the dye-liquor and their weight when out of said liquor, so that the skeins of yarn constantly take new bearing-surfaces upon said poles and every part of each skein is equally exposed to the operation of the dye-liquor in the course of a number of revolutions of the reel, also that the descending and ascending members of the chain approach each other below the reel, (see Figs. 2 and 3,) bringing the two poles which support any given skein of yarn nearer to each other and slacking said skein and allowing the dye-liquor to enter all parts of said skein, the skeins being kept from lateral movement of any considerable amount by friction on the poles and yarn-guard, but without being rigidly held by said poles and guards. After the yarn has been properly dyed it is raised out of the dye-vat by the hoist, swung over the water-tank, and lowered into the same. The water for the hoist is brought from public water-works or other source in a supply-pipe $h$ to the three-way cock H, entering one of the ways $h'$ thereof, another of said ways $h^2$ being connected with the cylinder B by the pipe $h^4$, and the third way $h^3$ being connected with the waste-pipe $h^5$. The cock H is provided with a plug $h^6$, having ways $h^7$ $h^8$ arranged at such a distance as to be capable of connecting the way $h^2$ either with the way $h'$ or with the way $h^3$, with the former to fill the cylinder and hoist the reel, with the latter to discharge the cylinder and lower the reel. A lever $h^9$ is secured to the plug and enables said plug to be turned by hand to either of its positions, or to a position in which neither of the ways of the plug coincide with any way of the cock. When the lever $h^9$ is in its horizontal position, (see Fig. 14,) the water enters the cylinder B and raises the ram B', reel C, and chains D, with the skeins of yarn thereon, high enough to clear the top of the dye-vat, when said lever is automatically raised by a chain or cord $h^{10}$, the upper end of which is attached to the ram and which passes freely through a hole in said lever near the free end thereof, terminating in an enlargement $h^{11}$ greater than said hole, which, striking against the lever, lifts it to an angle of forty-five degrees and shuts off all the ways $h'$ $h^2$ $h^3$, allowing the water neither to enter nor to escape from said cylinder B. (By making the enlargement $h^{11}$ heavy enough it will take up the slack of the cord or chain $h^{10}$ when the ram of the hoist descends.) The ram and the reel being raised, are then turned half-way around over the water-tank by any convenient means, as by pulling on a rope, (not shown,) which may be attached to the outer arm $b^2$ of the bracket $b'$. The lever $h^9$ is then raised to a vertical position, (see Fig. 14,) turning the plug so as to connect the cylinder B with the waste-pipe $h^5$, which allows the reel and its load to descend into the water-tank and brings the miter-gear $c^5$ into engagement with the miter-gear $c^6$, and causes the reel and chains D to be rotated precisely as in the above-described operation of dyeing. When the skeins of yarn have been sufficiently washed, they are removed from the machine by removing the poles F from the pole-receivers, which is done by drawing each pole F endwise against the springs $e^3$ until the ends of said poles farthest from the springs can be removed from their sockets.

Inasmuch as the distance from each sprocket $c^3$ to the next sprocket is necessarily the same, reckoning from center to center, as the distance from one sprocket-receiving link $d'$ to the next sprocket-receiving link, it is evident that by removing a suitable equal number of single $d$ and double $d'$ links the chains will fit the sprocket-wheels $c'$ $c^2$ closely and form, in effect, the rims of such wheels, thus allowing the pole-journals to be supported at an unvarying distance from the shaft $c$ or from the centers of said wheels, in which case the machine will still perform its above-described functions, except that of varying the tension of the skeins by varying the distance between the poles.

I claim as my invention—

1. The combination of a dye-vat, a water-tank, said tank and vat being separate and disconnected from each other, a hoist arranged at equal distances from said vat and tank and having a stationary part and a vertically-movable part provided with a laterally-extending arm or bracket, adapted to be raised and to be swung over said vat or tank, and a reel having a horizontal shaft permanently journaled in said arm, as and for the purpose specified.

2. The combination of a dye-vat, a water-tank, a hoist arranged at equal distances from said vat and tank and provided with a laterally-extending arm or bracket, adapted to be raised and to be swung over said vat or tank, a reel, and guide-forks secured to said vat and tank and adapted to receive the outer journal-box of said reel, as and for the purpose specified.

3. The combination of a hoist having a stationary part and a vertically-movable part, a gear turning on said stationary part, mechanism for rotating said gear, a reel journaled in an arm or bracket with which said movable part of said hoist is provided and having a gear secured thereto concentrically therewith and adapted to engage said first-named gear by the lowering of said reel and to be disengaged therefrom when said reel is raised, as and for the purpose specified.

4. The combination of a hoist having a stationary part and a vertically-movable part, a gear turning on said stationary part, mechanism for rotating said gear, a reel journaled in an arm or bracket with which said movable part of said hoist is provided and having a gear secured thereto concentrically therewith and adapted to engage said first-named gear by the lowering of said reel and to be disengaged therefrom when said reel is raised, a worm-gear concentric with said first-named gear and secured thereto, a worm-shaft having a worm which engages said worm-gear, a clutch, one counterpart of which slides on said shaft and rotates therewith, the other counterpart of said clutch being loose on said shaft, and a driving-pulley loose on said shaft and rigidly secured to said last-named counterpart concentrically therewith, as and for the purpose specified.

5. The combination of a reel consisting of a shaft and two sprocket-wheels secured on said shaft, endless chains of equal lengths carried by said sprocket-wheels and extending below the same, and parallel poles journaled in said chains and adapted to approach each other by the curvature of said chains below said reel and to recede from each other as the curvature of said chains becomes less to vary the tension of a skein of yarn supported upon two of such poles, as and for the purpose specified.

6. The combination of two parallel concentric sprocket-wheels, a shaft on which both are fast, chains carried by said sprocket-wheels and each having arms extending therefrom in opposite directions in the plane in which such chain travels, and parallel poles eccentrically journaled in said arms near the free ends thereof to allow said poles to turn on said journals when immersed in a liquid and to vary the bearing-surfaces of a skein of yarn supported upon two of said poles, and thereby to expose equally all parts of said skein and yarn to the action of said liquid, as and for the purpose specified.

7. The combination of two parallel concentric sprocket-wheels, a shaft on which both are fast, chains carried by said sprocket-wheels and each having arms extending therefrom in opposite directions in the plane in which such chain travels, said arms having holes near their free ends, poles, and pole-receivers in which said poles are held, said receivers having journals eccentric to said poles and arranged in said holes parallel with each other to allow said poles to turn on said journals when immersed in a liquid and to vary the bearing-faces of a skein of yarn supported upon two of said poles, and thereby to expose equally all parts of said skein and yarn to the action of said liquid, as and for the purpose specified.

8. The combination of the reel and parallel poles of a material adapted to float in a liquid, said poles being carried by said reel and having eccentric journals, on which they are partially rotated when immersed in such liquid to change the bearing-surfaces of a skein of yarn, through which two of said poles pass, and to expose all parts of said skein equally to the action of said liquid, as and for the purpose specified.

9. The combination of the reel and parallel poles of wood, having eccentric journals, said poles being adapted to turn freely on said journals when immersed in a liquid to change the bearing-surfaces of a skein of yarn, through which two of said poles pass, and to expose all parts of said skein equally to the action of said liquid, as and for the purpose specified.

10. The combination of the pole-receiver having sockets and trunnions or journals and a pole adapted to enter said sockets and to be retained therein, said pole-receiver having a rod or yarn-guard connecting said sockets and arranged out of contact with said poles to retain skeins of yarn upon said pole between the ends thereof, as and for the purpose specified.

11. The combination of the pole-receiver having trunnions and sockets, said sockets opening toward each other and one of said sockets containing a spring, and a pole longer than the distance between said sockets and adapted to be thrust into one of said sockets against the resistance of said spring and to be forced endwise by the pressure of said spring into the other of said sockets, as and for the purpose specified.

12. The combination of the pole-receiver having sockets and a pole adapted to be held therein, said pole-receiver having trunnions or journals eccentric to said pole, as and for the purpose specified.

13. The combination of a pole oblong in vertical section and a pole-receiver having sockets to receive said pole and having journals or trunnions eccentric to said pole, as and for the purpose specified.

14. The combination of a dye-vat, steam-pipes arranged therein to heat dye-liquor contained in said vat, and a shield or diaphragm secured in said dye-vat and extending nearly from side to side thereof to prevent yarns suspended in said vat above said shield from being tangled by the violent ebullition of said dye-liquor, as and for the purpose specified.

15. The combination of a hydraulic hoist having a cylinder and a vertically-movable ram, a reel journaled on said ram, a valve or cock having a three-way-valve case and a two-way plug turning therein, one of the ways of said valve-case being connected to a supply-pipe, another to the cylinder of said hoist, and a third to a waste-pipe, said supply-pipe and said waste-pipe to enable said ram and reel to be raised, lowered, or held in an elevated position by the turning of said plug, as and for the purpose specified.

16. The combination of a hydraulic hoist having a cylinder and a vertically-movable ram, a reel journaled on said ram, a valve or cock having a three-way-valve case and a two-way plug turning therein, one of the ways of said valve-case being connected to a supply-pipe, another to the cylinder of said hoist, and a third to a waste-pipe, said supply-pipe, said waste-pipe, a lever secured to said plug and provided with a hole near its free end, and a chain secured at one end to said ram and passing through the hole in said lever and provided at the other end with an enlargement adapted to strike against and turn said lever to shut off the supply from said cylinder when said reel and hoist are raised to a proper height, as and for the purpose specified.

17. The combination of a hydraulic hoist having a cylinder and a vertically-movable ram, a reel journaled on said ram, a valve or cock having a three-way-valve case and a two-way plug turning therein, one of the ways of said valve-case being connected to a supply-pipe, another to the cylinder of said hoist, and a third to a waste-pipe, said supply-pipe, said waste-pipe, a lever secured to said plug and provided with a hole near its free end, and a chain secured at one end to said ram and passing freely through the hole in said lever and provided at the other end with an enlargement adapted to strike against and turn said lever to shut off the supply from said cylinder when said reel and hoist are raised to a proper height, said enlargement being of sufficient weight to take up the slack of said chain above said lever when said ram is again lowered, as and for the purpose specified.

In witness whereof I have signed this specification, in the presence of two attesting witnesses, this 30th day of December, A. D. 1890.

ALVIN S. LYON.

Witnesses:
ALBERT M. MOORE,
MYRTIE C. BEALS.